United States Patent
Huang

(10) Patent No.: US 8,056,812 B2
(45) Date of Patent: Nov. 15, 2011

(54) HOLDING DEVICE

(75) Inventor: Hung Ming Huang, Taipei (TW)

(73) Assignee: Wistron Corp., New Taipei (TW)

( * ) Notice: Subject to any disclaimer, the term of this patent is extended or adjusted under 35 U.S.C. 154(b) by 244 days.

(21) Appl. No.: 12/477,772

(22) Filed: Jun. 3, 2009

(65) Prior Publication Data

US 2010/0065645 A1 Mar. 18, 2010

(30) Foreign Application Priority Data

Sep. 16, 2008 (TW) .............................. 97216713 U

(51) Int. Cl.
*G06K 7/00* (2006.01)
*A47B 19/00* (2006.01)
*G09F 3/18* (2006.01)

(52) U.S. Cl. .................. 235/486; 248/441.1; 40/642.02; 40/649; 40/651

(58) Field of Classification Search .................. 235/486; 40/649, 651, 652, 658, 661.08, 642.02; 248/441.1, 248/442.2, 447.1, 447.2, 447
See application file for complete search history.

(56) References Cited

U.S. PATENT DOCUMENTS

| 5,819,456 A * | 10/1998 | Schwartz ................... 40/642.01 |
| 6,533,236 B1 * | 3/2003 | MacLellan et al. ........ 248/442.2 |
| 7,487,940 B2 * | 2/2009 | Saez et al. .................. 248/176.1 |
| 7,823,856 B2 * | 11/2010 | Schwartz et al. .......... 248/442.2 |
| 2003/0177682 A1 * | 9/2003 | Bing et al. ....................... 40/658 |
| 2009/0072786 A1 * | 3/2009 | Lin et al. ....................... 320/114 |

\* cited by examiner

*Primary Examiner* — Karl D Frech
*Assistant Examiner* — April Taylor

(57) ABSTRACT

A holding device for holding an object, which is disposed on an electronic device in a detachable manner, is disclosed. The holding device comprises a first holding portion, a second holding portion and a connecting portion. The first holding portion comprises a first holding member and a second holding member. The first holding member and the second holding member are foldable toward a first direction and a second direction, respectively to form an accommodating space for accommodating the electronic device. The second holding portion holds the object. The connecting portion connects the first holding portion with the second holding portion in a foldable manner. Additionally, the connecting portion, the first holding portion and the second holding portion are integrally formed as a single piece.

16 Claims, 6 Drawing Sheets

HOLDING DEVICE

CROSS REFERENCE TO RELATED APPLICATIONS

This Application claims priority of Taiwan Patent Application No. 097216713, filed on Sep. 16, 2008, the entirety of which is incorporated by reference herein.

BACKGROUND OF THE INVENTION

1. Field of the Invention

The present invention relates to a holding device, and in particular, to a foldable holding device with a lighter volume.

2. Description of the Related Art

A conventional business card scanner usually comprises a web camera and a base. The web camera and the business card are placed on the base, and the web camera captures the image of the business card. By connecting to the computer through an external wire, the web camera can transmit the image to the computer. However, the web camera, the base and the wire of the conventional business card scanner respectively take up a certain amount of volume, which results in a more complex packaging procedure and inconvenience for users when carried.

BRIEF SUMMARY OF THE INVENTION

Accordingly, the invention provides a holding device for holding an object, which is disposed on an electronic device in a detachable manner. The holding device comprises a first holding portion, a second holding portion and a connecting portion. The first holding portion comprises a first holding member and a second holding member. The first holding member and the second holding member are foldable toward a first direction and a second direction, respectively to form an accommodating space for accommodating the electronic device. The second holding portion holds the object. The connecting portion connects the first holding portion with the second holding portion.

The invention provides another holding device for holding an object, which is disposed on an electronic device in a detachable manner. The holding device comprises a connecting portion, a first holding portion and a second holding portion. The first holding portion connects with an end of the connecting portion in a foldable manner for holding the electronic device. The second holding portion connects with the other end of the connecting portion in a foldable manner for holding the object. The connecting portion, the first holding portion and the second holding portion are integrally formed as a single piece.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
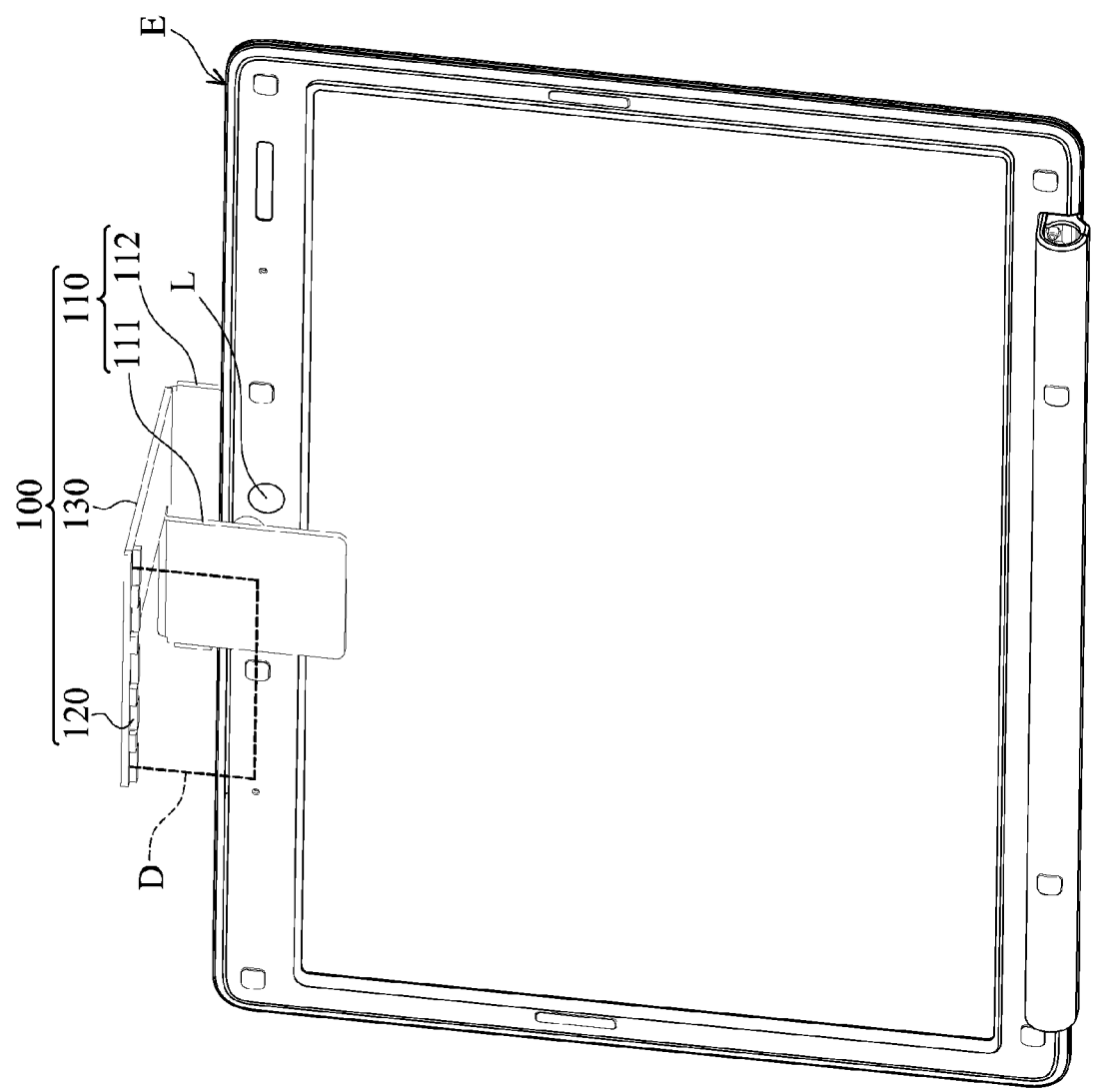
FIG. 1 is a schematic view of a holding device of an embodiment attached to an electronic device.

FIG. 1 is a schematic view of a holding device of an embodiment attached to an electronic device. Referring to FIG. 1, the holding device 100 of the embodiment, for holding a business card D, is detachably disposed on an electronic device E, wherein the electronic device E is a portable computer (a notebook). The holding device 100 clamps the upper portion of the display screen of the portable computer E and is positioned corresponding to the camera lens L, such that the camera lens L, equipped by the portable computer E, can directly capture the image of the business card D.

Figure 2:
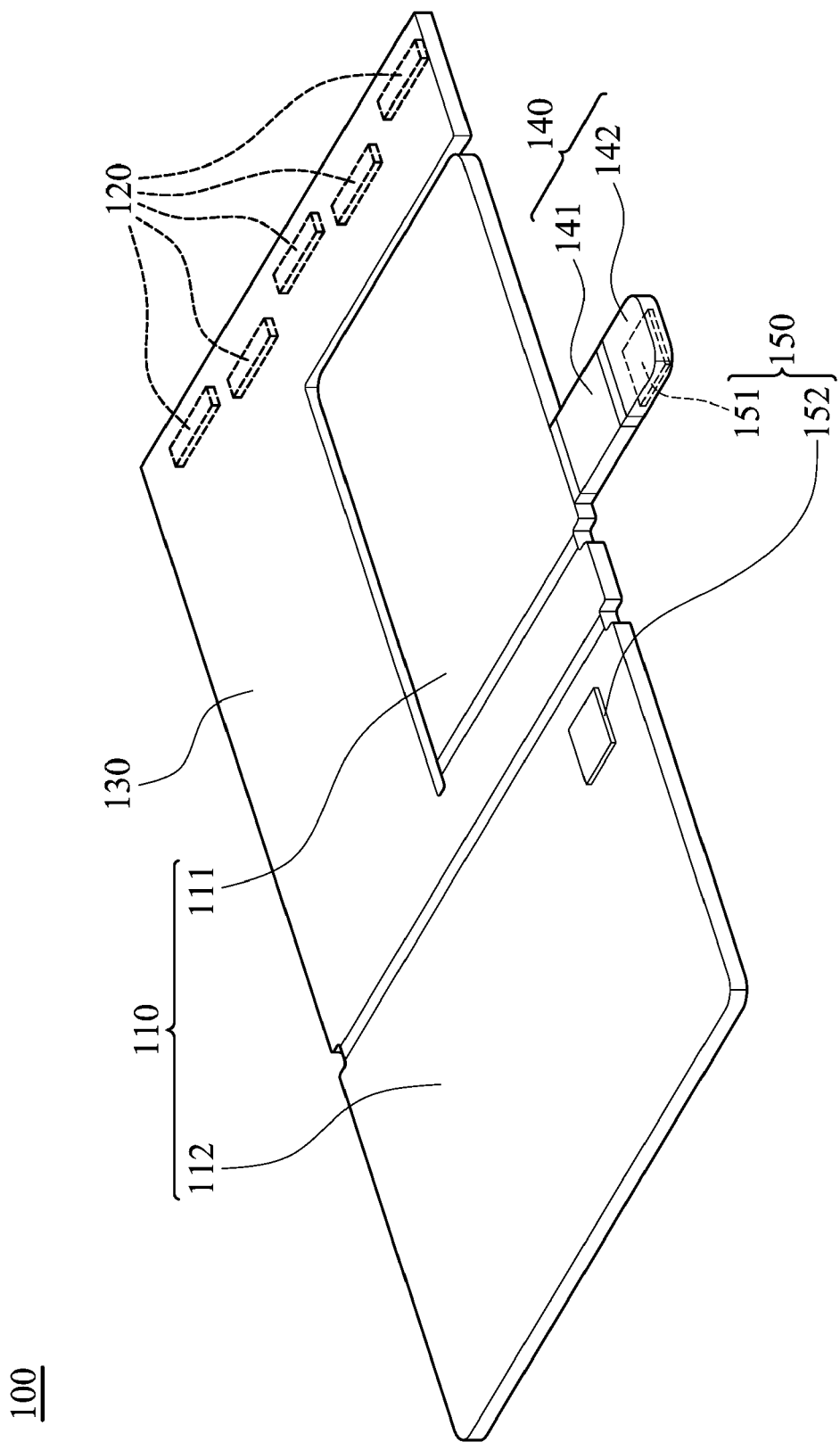
FIG. 2 is a schematic view of the holding device of the embodiment in a storage status.

FIG. 2 is a schematic view of the holding device of the embodiment in a storage status. Referring to FIG. 2, the holding device 100, made of Polypropylene plastic or metal (aluminum), comprises a first holding portion 110, a second holding portion 120, a connecting portion 130, a fastening portion 140 and an adhesive member 150, wherein the first holding portion 110, the second holding portion 120, the connecting portion 130 and the fastening portion 140 are integrally formed as a single piece. The first holding portion 110 and the connecting portion 130 comprise the same thickness. When the holding device 100 is in the storage status, the first holding portion 110 and the connecting portion 130 connected thereto form a rectangle.

Figure 3:
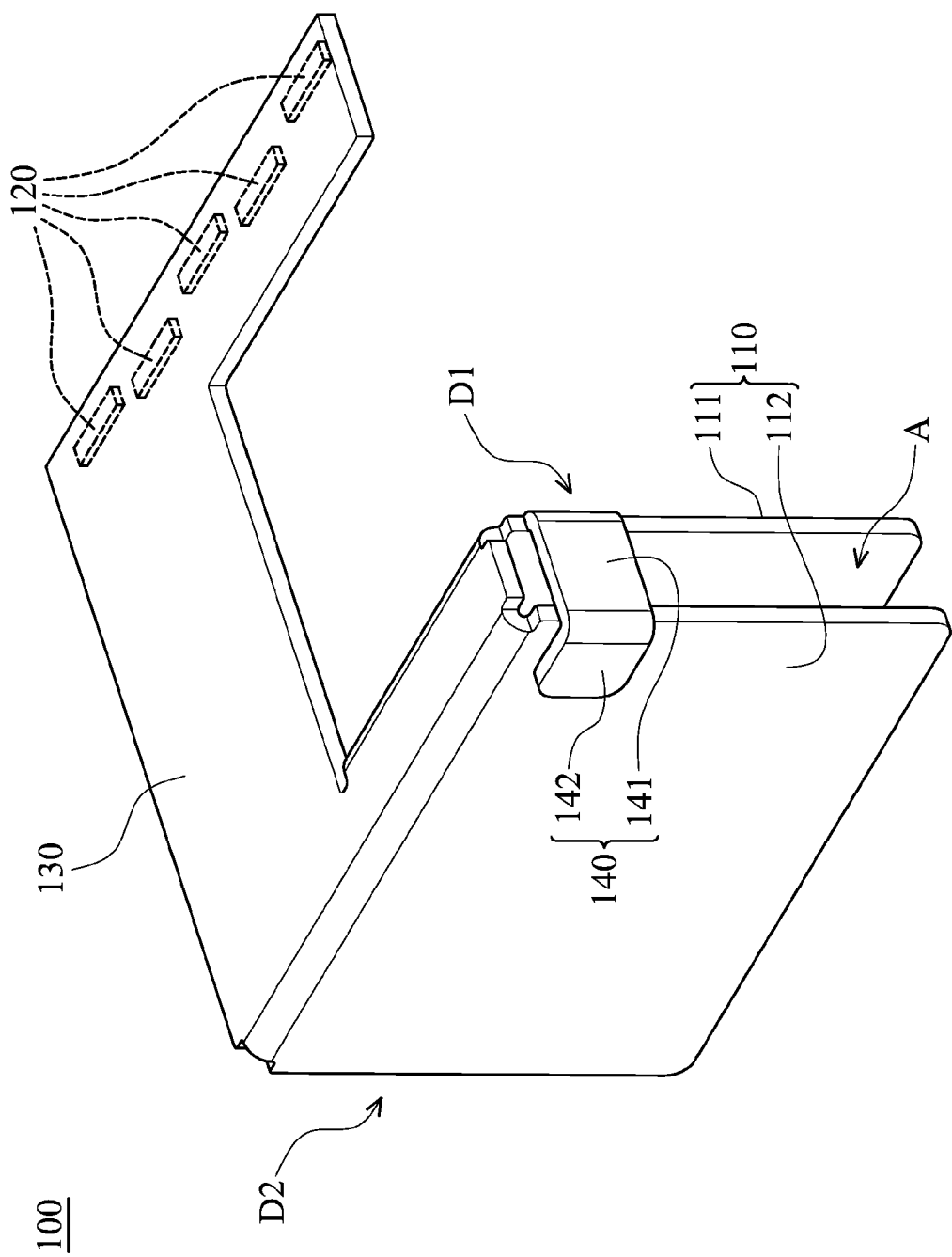
FIG. 3 is a schematic view of the holding device of the embodiment in a folded status.
Figure 4:
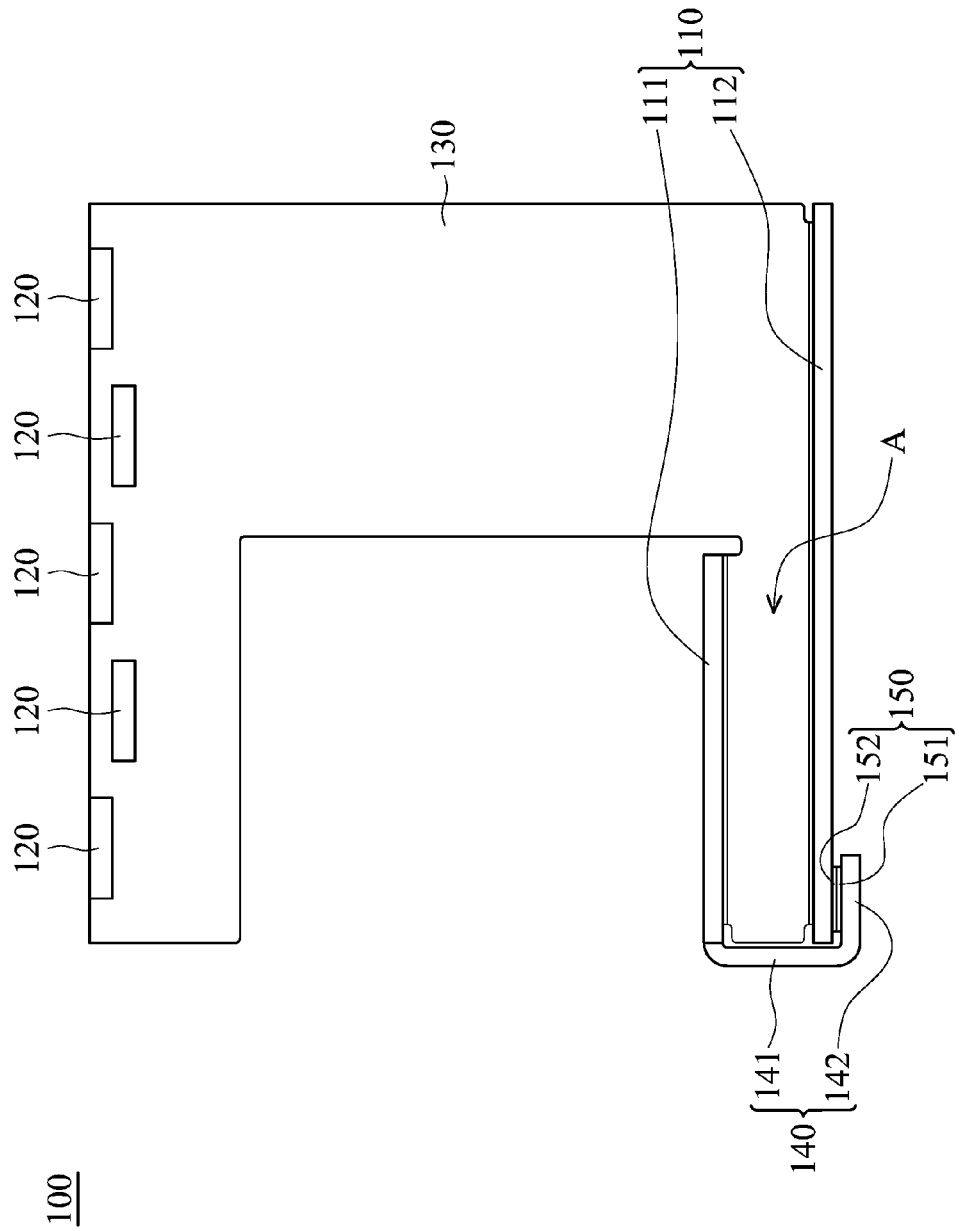
FIG. 4 is a bottom view of the holding device of the embodiment in a folded status.

FIG. 3 is a schematic view of the holding device of the embodiment in a folded status. FIG. 4 is a bottom view of the holding device of the embodiment in a folded status. Referring to FIGS. 3 and 4, the first holding portion 110 connects with an end of the connecting portion 130 in a foldable manner, and comprises a first holding member 111 and a second holding member 112. The first holding member 111 is next bent toward a first direction D1, and the second holding member 112 is bent toward a second direction D2 (as shown in FIG. 3) to form an accommodating space A between the first holding member 111 and the second holding member 112 for the electronic device E to be disposed therein.

The second holding portion 120 connects with the other end of the connecting portion 130, and comprises a plurality of protrusions protruding from a surface of the connecting portion 130, such that the business card D is able to be clamped between two rows of the protrusions.

The fastening portion 140 comprises a first bending part 141 and a second bending part 142. The first bending part 141 connects with the first holding member 111 in a foldable manner, and the second bending part 142 connects with the first bending part 141 in a foldable manner. The adhesive member 150 is a hook-and-loop fastener comprising a hook pad 151 and a loop pad 152, which are respectively disposed on the second bending part 142 and the second holding member 112.

The second bending part 142 is fastened to the second holding member 112 in a detachable manner. When the second bending part 142 connects with the second holding member 112, the hook pad 151 adheres to the loop pad 152 (as shown in FIG. 4) to fasten the first holding member 111 and the second holding member 112, such that the electronic device E is securely clamped and disposed in the accommodating space A (as shown in FIG. 1). To separate the second bending part 142 from the second holding member 112, the hook pad 151 is detached from the loop pad 152.

It should be noted that the folding joints of the holding device 100 of the embodiment utilizes the flexible characteristic of the material itself to form flexible hinges. Thus, the bending portion is not damaged due to over bending of the material.

Figure 5:
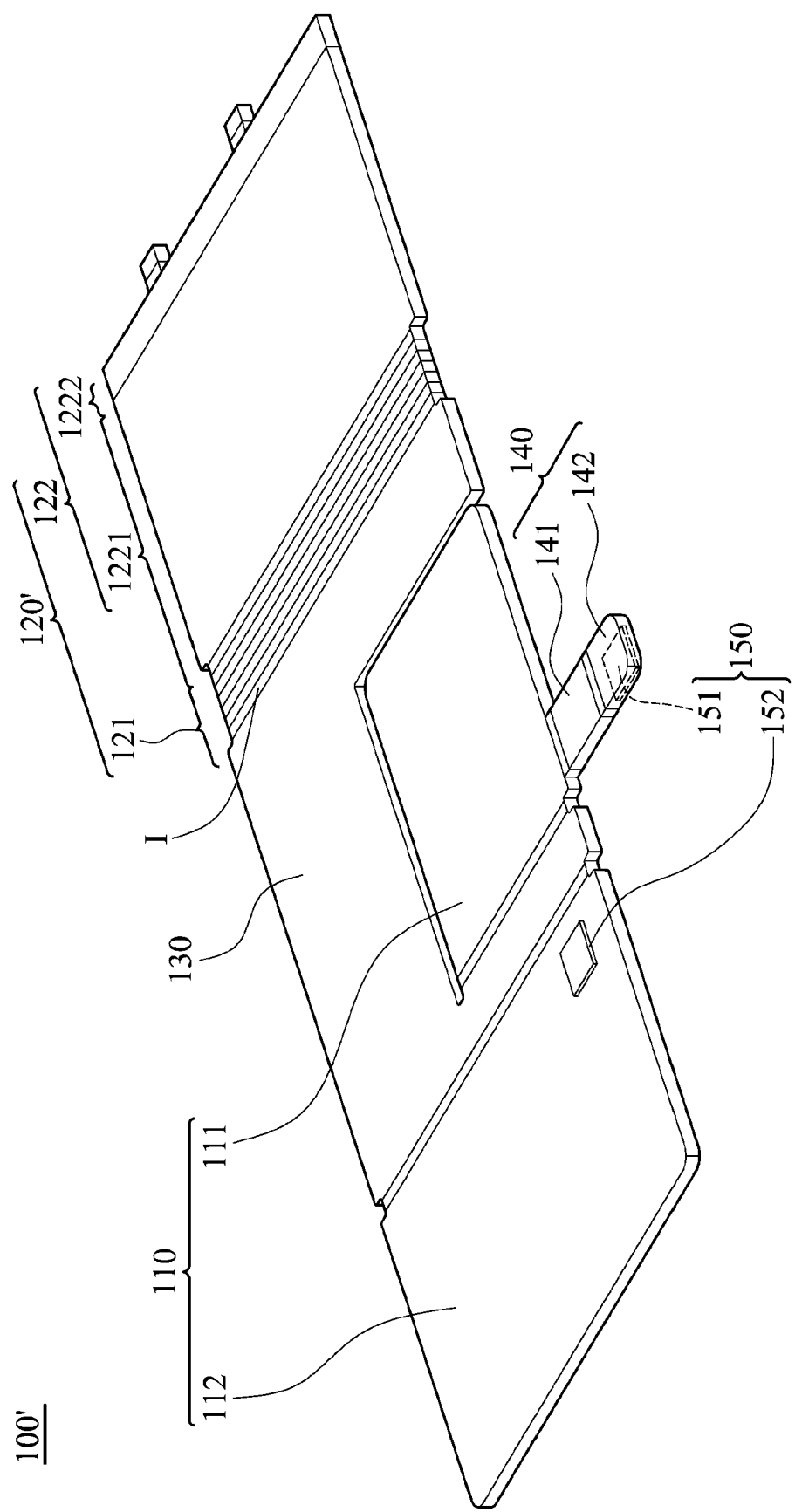
FIG. 5 is a schematic view of a holding device of another embodiment in a storage status.
Figure 6:
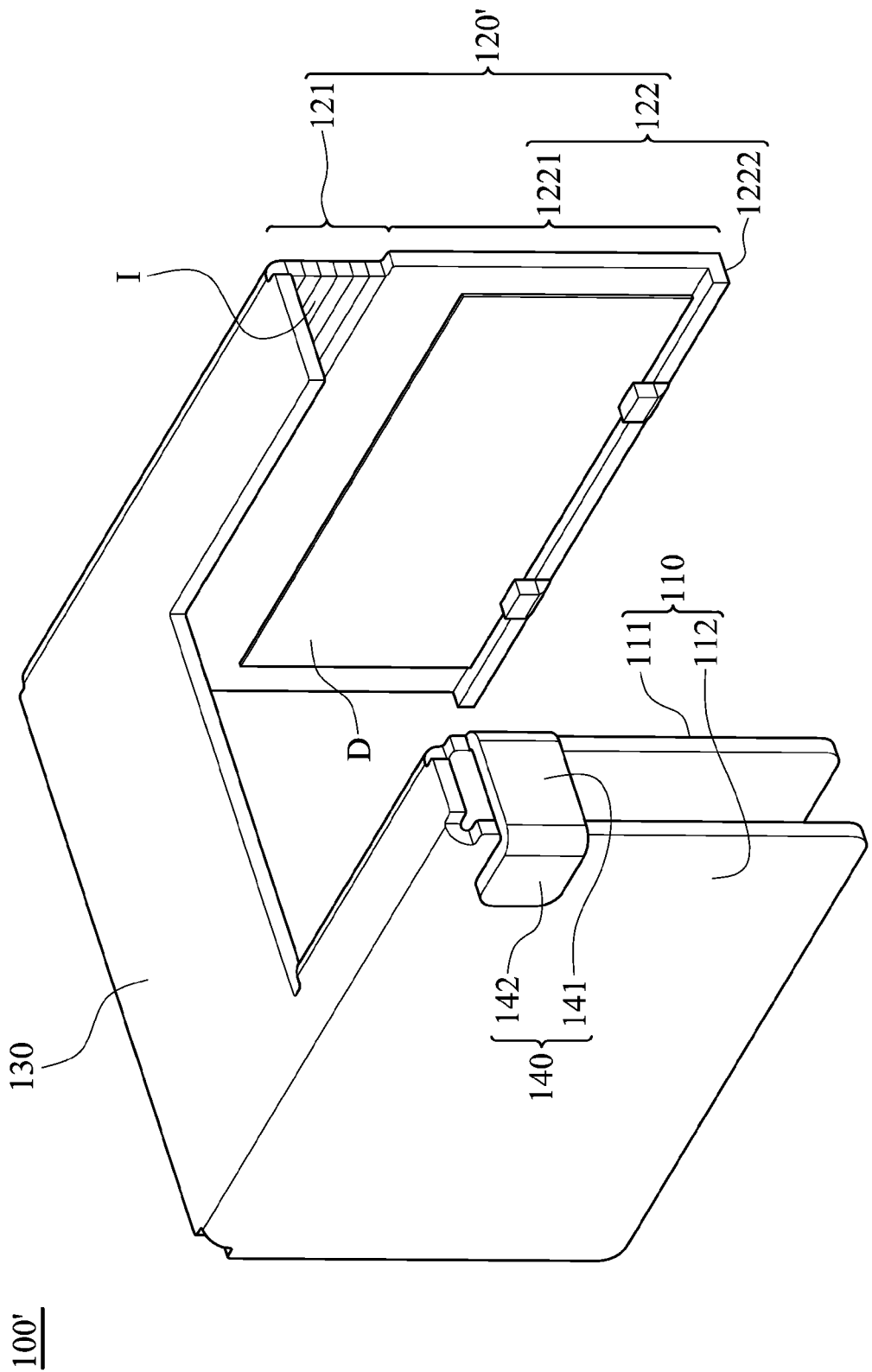
FIG. 6 is a schematic view of the holding device in FIG. 5 in a folded status.

FIG. 5 is a schematic view of a holding device of another embodiment in a storage status. FIG. 6 is a schematic view of the holding device in FIG. 5 in a folded status. Descriptions of the components in FIGS. 5 and 6 that are referenced with the same numbers as those in FIGS. 1-4 and comprise the same functions and relative positions, are omitted for brevity. Referring to FIGS. 5 and 6, in this embodiment, the holding portion 120' of the holding device 100' connects with the connecting portion 130 in a foldable manner. Additionally, the first holding portion 110, the second holding portion 120' and the connecting portion 130 comprise the same thickness. When the holding device 100' is in the storage status, the first holding portion 110, the second holding portion 120' and the connecting portion 130 together form a rectangle (as shown in FIG. 5).

In this embodiment, the second holding portion 120' comprises an adjusting part 121 and a supporting part 122. The adjusting part 121 connects with the connecting portion 130 and comprises a plurality of indicating lines I. The supporting part 122 connects with the adjusting part 121 and comprises a back panel 1221 and a tray 1222. The back panel 1221 connects with the adjusting part 121 in a foldable manner. By bending any of the indicating lines I, the supporting part 122 is bent corresponding to the connecting portion 130. Moreover, the tray 1222 connects with the back panel 1221 in a foldable manner. After folding the tray 1222, the business card D is able to be placed on the tray 1222 and abuts against the tray 1221 (as shown in FIG. 6).

When the holding device 100' is clamped on the electronic device E, the business card D placed on the supporting part 122 is parallel with the lens L of the electronic device E. By bending different indicating lines I, the distance between the first holding portion 110 and the second holding portion 120' is also the distance between the lens L and the business card D can be adjusted. After the distance therebetween is properly adjusted, the image of the business card D is captured by the lens L.

The holding device holds the business card on the electronic device by bending integrally formed components, thus efficiently saving costs and manufacturing time. Additionally, when packaging the holding device, every component is bent back to its original state to conform to the shape of a flat panel, thus increasing user convenience when being carried.

While the present invention has been described by way of example and in terms of preferred embodiment, it is to be understood that the present invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A holding device, for holding an object, disposed on an electronic device in a detachable manner, comprising
    a first holding portion comprising a first holding member and a second holding member, wherein the first holding member and the second holding member are foldable toward a first direction and a second direction, respectively, to form an accommodating space for accommodating the electronic device;
    a fastening portion, connected with the first holding member in a foldable manner, wherein the fastening portion comprises a first bending part and a second bending part, the first bending part connects with the first holding member in a foldable manner, and the second bending part connects with the first bending part in a foldable manner;
    a second holding portion holding the object; and
    a connecting portion connecting the first holding portion with the second holding portion.

2. The holding device as claimed in claim 1, wherein the second bending part is detachably fastened to the second holding member.

3. The holding device as claimed in claim 1, further comprising an adhesive member disposed between the second bending part and the second holding member.

4. The holding device as claimed in claim 3, wherein the adhesive member is a hook-and-loop fastener comprising a hook pad and a loop pad, respectively disposed on the second bending part and the second holding member.

5. The holding device as claimed in claim 1, wherein the second holding portion comprises a plurality of protrusions protruding from a surface of the connecting portion, and the object is held between the protrusions.

6. The holding device as claimed in claim 1, wherein the second holding portion connects with the connecting portion in a foldable manner.

7. The holding device as claimed in claim 1, wherein the second holding portion comprises an adjusting part and a supporting part, and the adjusting part, connected with the connecting portion, comprises a plurality of indicating lines, and the supporting part connects with the adjusting part, and by bending any of the indicating lines, the supporting part is foldable with respect to the connecting portion.

8. The holding device as claimed in claim 7, wherein the supporting part comprises a back panel and a tray, the back panel connects with the adjusting part in a foldable manner, and the tray connects with the back panel in a foldable manner.

9. A holding device, for holding an object, disposed on an electronic device in a detachable manner, comprising
    a connecting portion;
    a first holding portion, connected with an end of the connecting portion in a foldable manner, holding the electronic device, wherein the first holding portion comprises a first holding member and a second holding member respectively connected with the connecting portion in a foldable manner;
    a fastening portion connected with the first holding member in a foldable manner, wherein the fastening portion comprises a first bending part and a second bending part, and the first bending part connects with the first holding member in a foldable manner, and the second bending part connects with the first bending part in a foldable manner; and
    a second holding portion, connected with the other end of the connecting portion in a foldable manner, holding the object,
    wherein the connecting portion, the first holding portion and the second holding portion are integrally formed as a single piece.

10. The holding device as claimed in claim 9, wherein the second bending part is detachably fastened to the second holding member.

11. The holding device as claimed in claim 9, further comprising an adhesive member disposed between the second bending part and the second holding member.

12. The holding device as claimed in claim 11, wherein the adhesive member is a hook-and-loop fastener comprising a hook pad and a loop pad, respectively disposed on the second bending part and the second holding member.

13. The holding device as claimed in claim 9, wherein the second holding portion comprises a plurality of protrusions protruding from a surface of the connecting portion, and the object is held between the protrusions.

14. The holding device as claimed in claim 9, wherein the second holding portion connects with the connecting portion in a foldable manner.

15. The holding device as claimed in claim 9, wherein the second holding portion comprises an adjusting part and a supporting part, and the adjusting part, connected with the connecting portion, comprises a plurality of indicating lines, and the supporting part connects with the adjusting part, and by bending any of the indicating lines, the supporting part is foldable with respect to the connecting portion.

16. The holding device as claimed in claim 15, wherein the supporting part comprises a back panel and a tray, the back panel connects with the adjusting part in a foldable manner, and the tray connects with the back panel in a foldable manner.

* * * * *